US012438353B2

(12) United States Patent
Jimenez Gonzalez et al.

(10) Patent No.: US 12,438,353 B2
(45) Date of Patent: Oct. 7, 2025

(54) FAULT LOGIC BASED OPERATING SYSTEM FOR ONE OR MORE DISCONNECTS IN A CIRCUIT BREAKER, WITH PROVISION OF LIMITED AUTOMATIC SELF-RESET AND/OR RESET BY SOFTWARE APPLICATION

(71) Applicant: EATON INTELLIGENT POWER LIMITED, Dublin (IE)

(72) Inventors: Sandy Omar Jimenez Gonzalez, Coraopolis, PA (US); Nicholas David Reynolds, Monroeville, PA (US); Karthik Satyanarayanan, Vellore (IN); Harish Gode, Pune (IN); Tejal Sheth, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 201 days.

(21) Appl. No.: 18/210,933

(22) Filed: Jun. 16, 2023

(65) Prior Publication Data

US 2023/0411948 A1 Dec. 21, 2023

Related U.S. Application Data

(60) Provisional application No. 63/353,169, filed on Jun. 17, 2022.

(51) Int. Cl.
*H02H 3/04* (2006.01)
*H01H 71/04* (2006.01)
*H02H 1/00* (2006.01)

(52) U.S. Cl.
CPC .............. *H02H 3/04* (2013.01); *H01H 71/04* (2013.01); *H02H 1/0007* (2013.01)

(58) Field of Classification Search
CPC .......... H02H 3/04; H02H 1/0007; H02H 3/32; H02H 3/066; H02H 3/093; H02H 3/335; H01H 71/04

(Continued)

(56) References Cited

U.S. PATENT DOCUMENTS 5,303,112 A * 4/1994 Zulaski ................. H02H 3/063
361/67
6,667,866 B1 * 12/2003 LaPlace ................ H02H 3/063
361/87

(Continued)

*Primary Examiner* — Dharti H Patel
(74) *Attorney, Agent, or Firm* — Eckert Seamans Cherin & Mellott, LLC

(57) ABSTRACT

A circuit breaker with at least one disconnect mechanism and a smart monitoring system implements nuanced fault logic in order to minimize disruption to operation of the circuit breaker under a fault condition, and enables the circuit breaker to address nuisance or low severity faults separately from load switching. Under low severity or nuisance fault conditions, the smart monitoring system temporarily disconnects affected loads from the power supply rather than tripping the entire circuit breaker so that the loads can be reconnected to the power supply if the fault condition resolves within a short amount of time. In addition, the disconnect mechanism(s) that are used to temporarily disconnect the load(s) are configured to be re-closed after opening without requiring manual intervention. In high severity fault conditions, the smart monitoring system actuates tripping of the entire breaker, requiring manual re-closing of the circuit breaker.

18 Claims, 16 Drawing Sheets

(58) Field of Classification Search
USPC .......................................................... 361/42
See application file for complete search history.

(56) References Cited

U.S. PATENT DOCUMENTS

| | | | | |
|---|---|---|---|---|
| 8,861,162 | B2* | 10/2014 | Fuller | H01H 9/548 |
| | | | | 361/42 |
| 10,630,069 | B2* | 4/2020 | Kennedy | H02H 3/445 |
| 11,348,752 | B2* | 5/2022 | Telefus | H01H 9/563 |
| 11,539,204 | B1* | 12/2022 | Dixit | H02H 1/0007 |
| 2011/0116196 | A1* | 5/2011 | Kellis | H02H 7/0816 |
| | | | | 361/30 |
| 2013/0070378 | A1* | 3/2013 | Witte | H01H 83/12 |
| | | | | 307/125 |
| 2013/0128396 | A1* | 5/2013 | Danesh | G01R 23/02 |
| | | | | 361/45 |
| 2019/0341213 | A1* | 11/2019 | Kouroussis | H01H 71/1081 |
| 2020/0365345 | A1* | 11/2020 | Telefus | H01H 71/24 |
| 2022/0060013 | A1* | 2/2022 | Zhou | H02H 3/08 |
| 2022/0328273 | A1* | 10/2022 | Vaghasiya | H02J 13/00004 |

\* cited by examiner

| Hardware Faults |
| --- |
| Failed_startup_ram_test |
| Failed_startup_rom_test |
| Failed_startup_processor_test |
| Data_overrun_trip |
| Invalid_data_sequence_trip |
| Incorrect_interrupt_count_trip |
| Hf_sense_fault_trip |
| Line_current_bias_error_trip |
| Ground_fault_current_bias_error_trip |
| Log_hf_min_detector_stuck_error_trip |
| Failed_continuous_ram_test_trip |
| Failed_continuous_rom_test_trip |
| Failed_continuous_processor_test_trip |
| Nonhandled_interrupt_trip |
| Failed_trip_attempt |
| Failed_self_check_gf_input |
| Failed_self_check_output |
| Failed_self_check_ct_direction |

FIG. 6

| S.no. 501 | Category 502 | Condition 503 | Opening Sequence of Breaker 504 | | | | |
|---|---|---|---|---|---|---|---|
| | | | First to Open 504A | Next to Open 504B | Command Signal 504C | End Result of Breaker Handle 504D | Power to Load 504E |
| 1 | Normal Operation | Switching ON of Breaker | — | — | — | — | — |
| 2 | | Switching OFF of Breaker | Primary (Manually) | Secondary (Automatically) | Microcontroller | Off | No |
| 3 | | Breaker Trip Due to Fault / Solenoid Actuation | Primary (Manually) | Secondary (Automatically) | Microcontroller | Trip | No |
| 5 | Power Outage & Subsequent Resuming of Pre-Outage OFF/ON Status | Breaker in OFF Condition | No State Change- Primary Remains Open | No State Change- Secondary Remains Open | — | Off | No |
| 6 | | Breaker in ON Condition | | | | | |
| 7 | Breaker Opening Sequence for Different Fault Condition | Thermal Fault | Secondary (Automatically) | Primary (Automatically) | Microcontroller | Trip | No |
| 8 | | Low Level Short Circuit Fault 1.5kA | Primary (Automatically) | Secondary (Automatically) | μcontroller Only for Secondary State Change | Trip | No |
| 9 | | High Level Short Circuit Fault 5.0kA | Primary (Automatically) | Secondary (Automatically) | μcontroller Only for Secondary State Change | Trip | No |

FIG. 7

| | | | | | |
|---|---|---|---|---|---|
| 10 | Rated Short Circuit Fault 10kA | Primary (Automatically) | Secondary (Automatically) | μcontroller Only for Secondary State Change | Trip | No |
| 11 | Nuisance Ground Fault | Secondary (Automatically) | — | μcontroller to Run 3 Cycles of Check and Change State of Secondary | On | Denial for 3 Sec |
| 12 | Permanent Ground Fault | Secondary (Automatically) | Primary (Automatically) | Microcontroller Logic | Trip | No |
| 13 | Low Level Arc Fault | Secondary (Automatically) | — | μcontroller to Run 3 Cycles of Check and Change State of Secondary | On | Denial Until Clearance |
| 14 | High Level Arc Fault | Secondary (Automatically) | Primary (Automatically) | Microcontroller Logic | Trip | No |

FIG. 7 (Continued)

| | Closing Sequence of Breaker | | | | |
|---|---|---|---|---|---|
| S.no. | First to Close | Next to Close | Command Signal | End Result of Breaker Handle | Power to Load |
| 1 | Primary (Manually) | Secondary (APP / Manually) | Microcontroller Via APP or Manual Switching | ON | YES |
| 2 | — | — | — | | |
| 3 | — | — | — | | |
| 4 | — | — | — | | |
| 5 | — | — | — | | |
| 6 | No State Change- Primary Remains Closed | Secondary Opens During Outage, Closes After Power Quality Check | Microcontroller | Tentatively OFF for Few Seconds then Will Reset to ON Condition | Resume Back After Few Seconds |
| 7 | — | — | — | | |

| C | 8 | 9 | 10 | 26 | 11 | 12 | 13 | 14 | D |
|---|---|---|----|----|----|----|----|----|---|
|   | — | — | —  | —  | —  | —  | —  | —  |   |
|   |   |   |    |    |    |    |    |    |   |
|   | — | — | —  | —  | —  | —  | —  | —  |   |
|   |   |   |    |    |    |    |    |    |   |
|   | — | — | —  | —  | —  | —  | —  | —  |   |

| S.no. | Category | Condition | Opening Sequence of Breaker | | | End Result of Breaker HANDLE | Power to Load |
|---|---|---|---|---|---|---|---|
| | | | First to Open | Next to Open | Command Signal | | |
| | | | 504A | 504B / 504 | 504C | 504D | 504E |
| 15 | Contact Closing Sequence For Different Fault Condition | Thermal Fault | - | - | - | - | - |
| 16 | | Low Level Short Circuit Fault 1.5kA | - | - | - | - | - |
| 17 | | High Level Short Circuit Fault 5.0kA | - | - | - | - | - |
| 18 | | Rated Short Circuit Fault 10kA | - | - | - | - | - |
| 19 | | Nuisance Ground Fault | - | - | - | - | - |
| 20 | | Permanent Ground Fault | - | - | - | - | - |
| 21 | | Low level Arc Fault | - | - | - | - | - |
| 22 | | High level Arc Fault | - | - | - | - | - |
| 23 | Outage of Power & Resuming - Fault State | Thermal Fault | - | - | - | - | - |
| 24 | | Low Level Short Circuit Fault 1.5kA | - | - | - | - | - |
| 25 | | High Level Short Circuit Fault 5.0kA | - | - | - | - | - |
| 26 | | Rated Short Circuit Fault 10kA | - | - | - | - | - |
| 27 | | Nuisance Ground Fault | - | - | - | - | - |
| 28 | | Permanent Ground Fault | - | - | - | - | - |
| 29 | | Low level Arc Fault | - | - | - | - | - |
| 30 | | High level Arc Fault | - | - | - | - | - |

FIG. 7 (Continued)

| 501 505 | | | Closing Sequence of Breaker | | | |
|---|---|---|---|---|---|
| S.no. | First to Close (505A) | Next to Close (505B) | Command Signal (505C) | End Result of Breaker Handle (505D) | Power to Load (505E) |
| 15 | Primary (Manually) | Secondary (Automatically) | Microcontroller Via App or Manual Switching | Trip Immediately In Shorter Duration Up to 20 mins | Yes, After 20 Mins |
| 16 | Secondary (Automatically) | Primary (Manually) | Microcontroller Via App or Manual Switching | Trip | No |
| 17 | Secondary (Automatically) | Primary (Manually) | Microcontroller Via App or Manual Switching | Trip | No |
| 18 | Secondary (Automatically) | Primary (Manually) | Microcontroller Via App or Manual Switching | Trip | No |
| 19 | Secondary (Automatically) | — | Microcontroller Logic | On | Yes, After 3 Sec |
| 20 | Secondary (Automatically) | Primary (Manually) | Microcontroller or Manual Switching | Trip | No |
| 21 | Primary (Manually) | Secondary (Automatically) | Microcontroller or Manual Switching | Trip | Denial 'Til Clearance, Program Check |

FIG. 7
(Continued)

| | | | | | |
|---|---|---|---|---|---|
| 22 | Primary (Manually) | Secondary (Automatically) | Microcontroller or Manual Switching | Trip | No |
| 23 | Primary (Manually) | Secondary (Automatically) | Manual Switching Followed By Microcontroller Logic | Trip Immediately in Shorter Duration or Get ON After 30 Mins of Trip Instance | Yes, After 20 - 30 Mins From Fault Time |
| 24 | Secondary (Automatically) | Primary (Manually) | Microcontroller Via App or Manual Switching | Trip | Denial 'Til Clearance & Manual Reset |
| 25 | Secondary (Automatically) | Primary (Manually) | Microcontroller Via App or Manual Switching | Trip | Denial 'Til Clearance & Manual Reset |
| 26 | Secondary (Automatically) | Primary (Manually) | Microcontroller Via App or Manual Switching | Trip | Denial 'Til Clearance & Manual Reset |
| 27 | Secondary (Automatically) | — | Microcontroller Logic | On | Yes, After 3 - 5 Sec Power Quality & GF Test |
| 28 | Secondary (Automatically) | Primary (Manually) | Microcontroller or Manual Switching | Trip | Denial 'Til Clearance Program Check |
| 29 | Primary (Manually) | Secondary (Automatically) | Microcontroller or Manual Switching | Trip | Denial 'Til Clearance Program Check |
| 30 | Primary (Manually) | Secondary (Automatically) | Microcontroller or Manual Switching | Trip | Denial 'Til Clearance Program Check |

FIG. 7 (Continued)

FAULT LOGIC BASED OPERATING SYSTEM FOR ONE OR MORE DISCONNECTS IN A CIRCUIT BREAKER, WITH PROVISION OF LIMITED AUTOMATIC SELF-RESET AND/OR RESET BY SOFTWARE APPLICATION

CROSS REFERENCE TO RELATED APPLICATIONS

This application claims priority to U.S. Patent Application Ser. No. 63/353,169, filed Jun. 17, 2022 and entitled, "Fault Logic Based Operating Of Principally Different Disconnects In Series, With Provision Of Limited Auto Reset By A Breaker And Software Application In A Circuit Breaker".

FIELD OF THE INVENTION

The disclosed concept relates generally to circuit interrupters, and in particular, to disconnect devices used to trip circuit breakers and to individual loads connected to a circuit breaker from receiving power.

BACKGROUND OF THE INVENTION

In circuit interrupters such as circuit breakers, one or more disconnect mechanisms can be actuated to isolate the entire breaker from a power source or to isolate individual loads from the power source. The disconnect mechanisms can be single contact-based, dual contact-based, multiple contact-based, or semiconductor-based. Generally, in a circuit interrupter that includes more than one disconnect mechanism, the disconnect mechanisms are positioned in series. The disconnect mechanisms can be arranged for clearing of current faults (e.g. overload and short circuit) and other faults (e.g. ground faults and arc faults) or for load switching, based on the configuration in the circuit breaker and number of disconnects available. Circuit interrupters typically include electronic monitoring systems (such as electronic trip units) that are used to monitor electrical conditions in the circuit interrupter and to actuate the disconnect mechanisms, as well as to track performance diagnostics and communicate said diagnostics to a user or to other systems.

While minimizing the impact of fault conditions within a circuit interrupter is an important objective, electronic monitoring systems can prioritize fault clearing to an extent that decreases efficiency of the overall circuit interrupter. For example, under a first set of fault condition circumstances, the electronic monitoring system may be programmed to actuate tripping the breaker in order to isolate the breaker from the power source when it would be sufficient to simply disconnect one or more loads. In another example, under a second set of fault condition circumstances, the electronic monitoring system may be programmed to actuate tripping the breaker in order to isolate the breaker from the power source, but if the fault condition is relatively low in severity, it may be more efficient to wait for a period of time to see if the fault resolves on its own before tripping the circuit breaker. Resetting the breaker after a trip typically requires manual intervention. Therefore, tripping a breaker and thereby disconnecting all loads from the power source, rather than just disconnecting those loads that are adversely affected by the fault conditions or waiting to see if the fault resolves on its own after a short delay, can sometimes cause unnecessary inefficiencies of the electrical system in which the circuit breaker is installed.

There is thus room for improvement in the actuation of disconnect mechanisms in circuit interrupters.

SUMMARY OF THE INVENTION

These needs, and others, are met by embodiments of a circuit breaker with at least one disconnect mechanism and a smart monitoring system that implements nuanced fault logic in order to disrupt operation of the circuit breaker as little as possible under a fault condition. Under low severity or nuisance fault conditions, the smart monitoring system temporarily disconnects affected loads from the power supply rather than tripping the entire circuit breaker so that the loads can be reconnected to the power supply if the fault condition resolves in a short amount of time. In addition, the disconnect mechanism(s) that are used to temporarily disconnect the load(s) are configured to be re-closed after opening without requiring manual intervention. In high severity fault conditions, the smart monitoring system actuates tripping of the entire breaker, requiring manual re-closing of the circuit breaker.

In accordance with one aspect of the disclosed concept, a circuit breaker comprises: a line conductor structured to be connected between a power source and a load; a primary disconnect device disposed along the line conductor; a primary disconnect trip system configured to actuate the primary disconnect device between an open state and a closed state; a secondary disconnect device disposed in series with the primary disconnect device along the line conductor; secondary disconnect driving circuitry configured to actuate the secondary disconnect device between an open state and a closed state; a number of monitoring devices configured to monitor operating conditions in the circuit breaker; and a controller configured to receive input from the number of monitoring devices, to communicate with a remote user communication device, and to communicate with the primary disconnect trip system and with the secondary disconnect driving circuitry. The primary disconnect device and the secondary disconnect device must be closed in order for the load to receive power from the power source. The controller is configured to determine when a fault condition exists in the circuit breaker based on the input from the number of monitoring devices and to determine a severity level of the fault condition. When the controller determines that the fault condition severity level is minor, the controller is configured to actuate the secondary disconnect driving circuitry to open the secondary disconnect device, wait for a delay time, assess the fault condition multiple times during the delay time, and determine if the fault condition has resolved within the delay time. When the fault condition has resolved within the delay time, the controller is configured to actuate the secondary disconnect driving circuitry to close the secondary disconnect device without manual intervention.

In accordance with another aspect of the disclosed concept, a circuit breaker comprises: a line conductor structured to be connected between a power source and a load; a primary disconnect device disposed along the line conductor; a primary disconnect trip system configured to actuate the primary disconnect device between a first open state and a first closed state; a primary disconnect open/close system configured to actuate the primary disconnect between a second open state and a second closed state; a number of monitoring devices configured to monitor operating conditions in the circuit breaker; and a controller configured to receive input from the number of monitoring devices, to communicate with a remote user communication device, and to communicate with the primary disconnect trip system and with the primary disconnect open/close system. The primary disconnect device must be closed in order for the load to receive power from the power source. The controller is configured to determine when a fault condition exists in the circuit breaker based on the input from the number of monitoring devices and to determine a severity level of the fault condition. When the controller determines that the fault condition severity level is minor, the controller is configured to actuate the primary disconnect open/close system to open the primary disconnect device, wait for a delay time, assess the fault condition multiple times during the delay time, and determine if the fault condition has resolved within the delay time. When the fault condition has resolved within the delay time, the controller is configured to actuate the primary disconnect open/close system to close the primary disconnect device without manual intervention.

In accordance with another aspect of the disclosed concept, a method of handling faults in a circuit breaker comprises: providing a first disconnect device along a line conductor of the circuit breaker between a power source and a load; monitoring operating conditions in the circuit breaker with a number of monitoring devices; detecting a fault condition with the controller based on input to the controller from the number of monitoring devices; and determining with the controller if a severity level of the fault condition is minor or high severity. When the fault condition is minor, the method further comprises: actuating the first disconnect device to open with the controller; waiting for a delay time; assessing the fault condition with the controller multiple times during the delay time; determining with the controller if the fault condition has resolved within the delay time; and when the fault condition has resolved within the delay time, actuating closing of the first disconnect device without manual intervention.

BRIEF DESCRIPTION OF THE DRAWINGS

A full understanding of the invention can be gained from the following description of the preferred embodiments when read in conjunction with the accompanying drawings in which:

FIG. 6 is a table with a non-limiting list of hardware faults that the smart monitoring systems of the circuit interrupters depicted in FIGS. 1-3 can identify, in accordance with exemplary embodiments of the disclosed concept;

FIG. 7 is a table of closing and opening sequences that are used under various operating conditions as identified by the smart solid state disconnects in the circuit interrupters depicted in FIG. 1 and FIG. 3, in accordance with an exemplary embodiment of the disclosed concept;

DETAILED DESCRIPTION OF THE INVENTION

Figure 1:
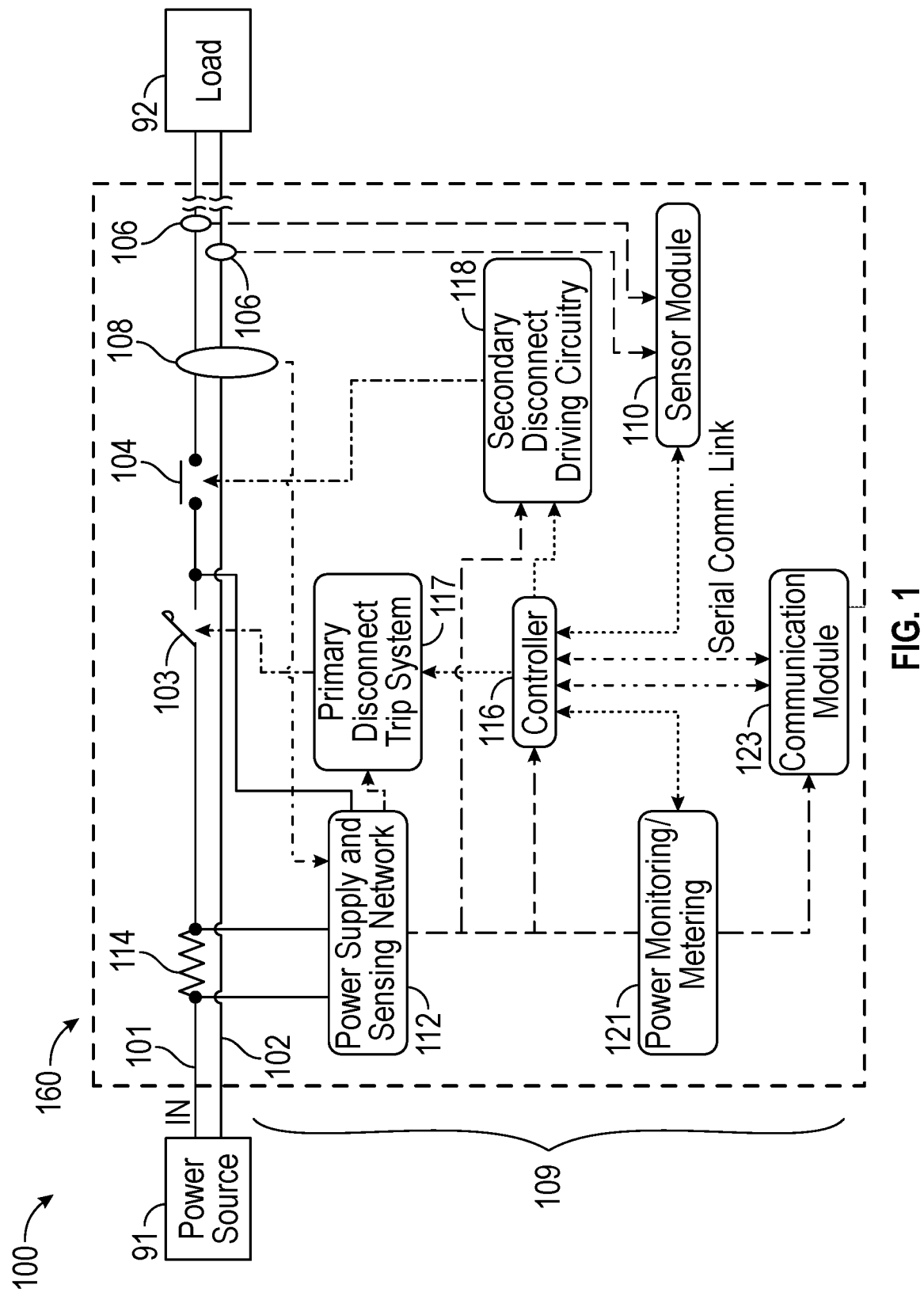
FIG. 1 is a schematic diagram of a circuit breaker with multiple disconnect devices in series and a smart monitoring system, in accordance with an exemplary embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

As employed herein, the term "controller" shall mean a programmable digital device that can store, retrieve, and process data; a microcontroller; a microprocessor; a microcomputer; a central processing unit; or any suitable processing device or apparatus.

As employed herein, the term "smart" denotes the ability of a device to self-monitor its performance and to self-report performance information.

Figure 2:
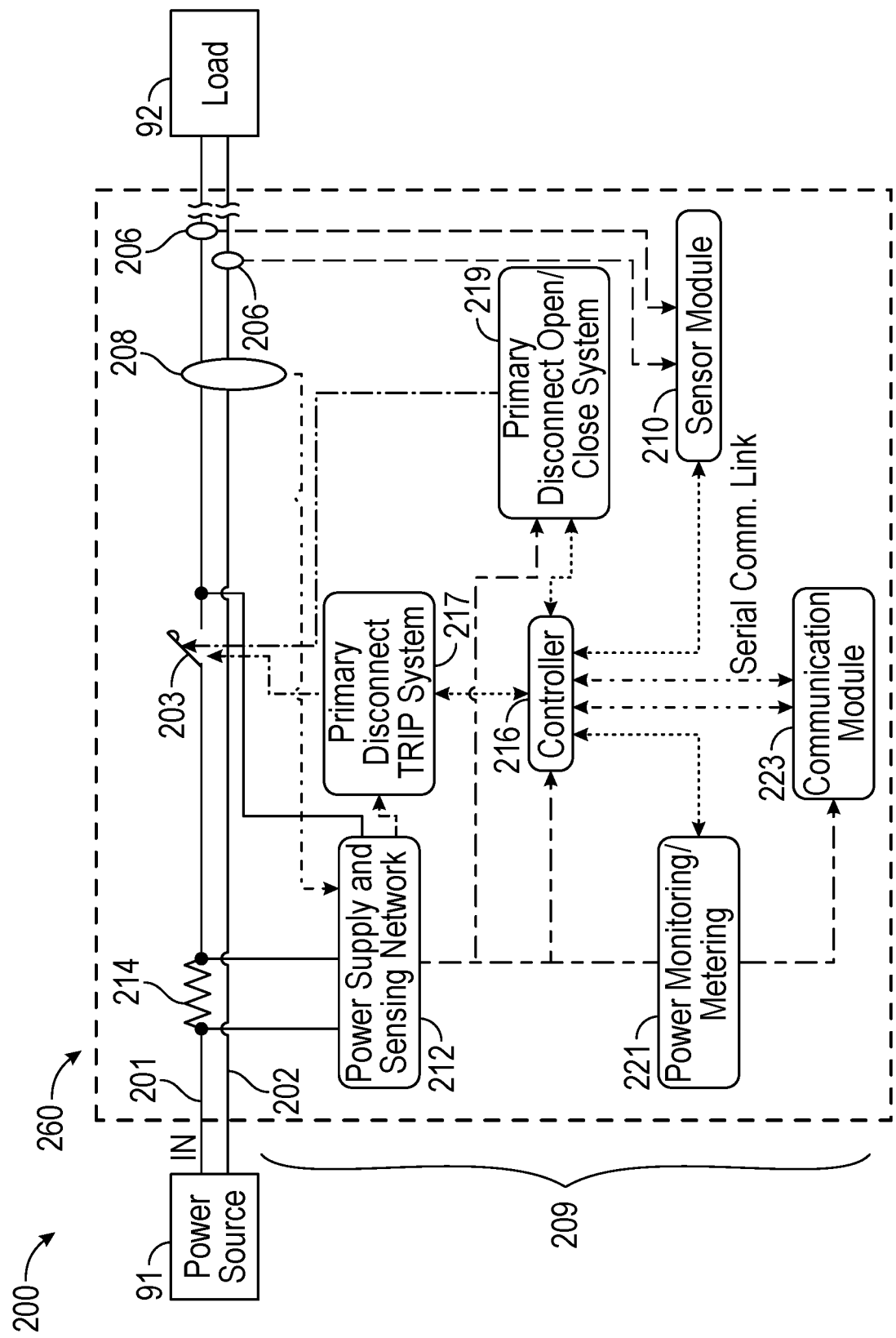
FIG. 2 is a schematic diagram of a circuit breaker with a single disconnect device and a smart monitoring system, in accordance with another exemplary embodiment of the disclosed concept.
Figure 3:
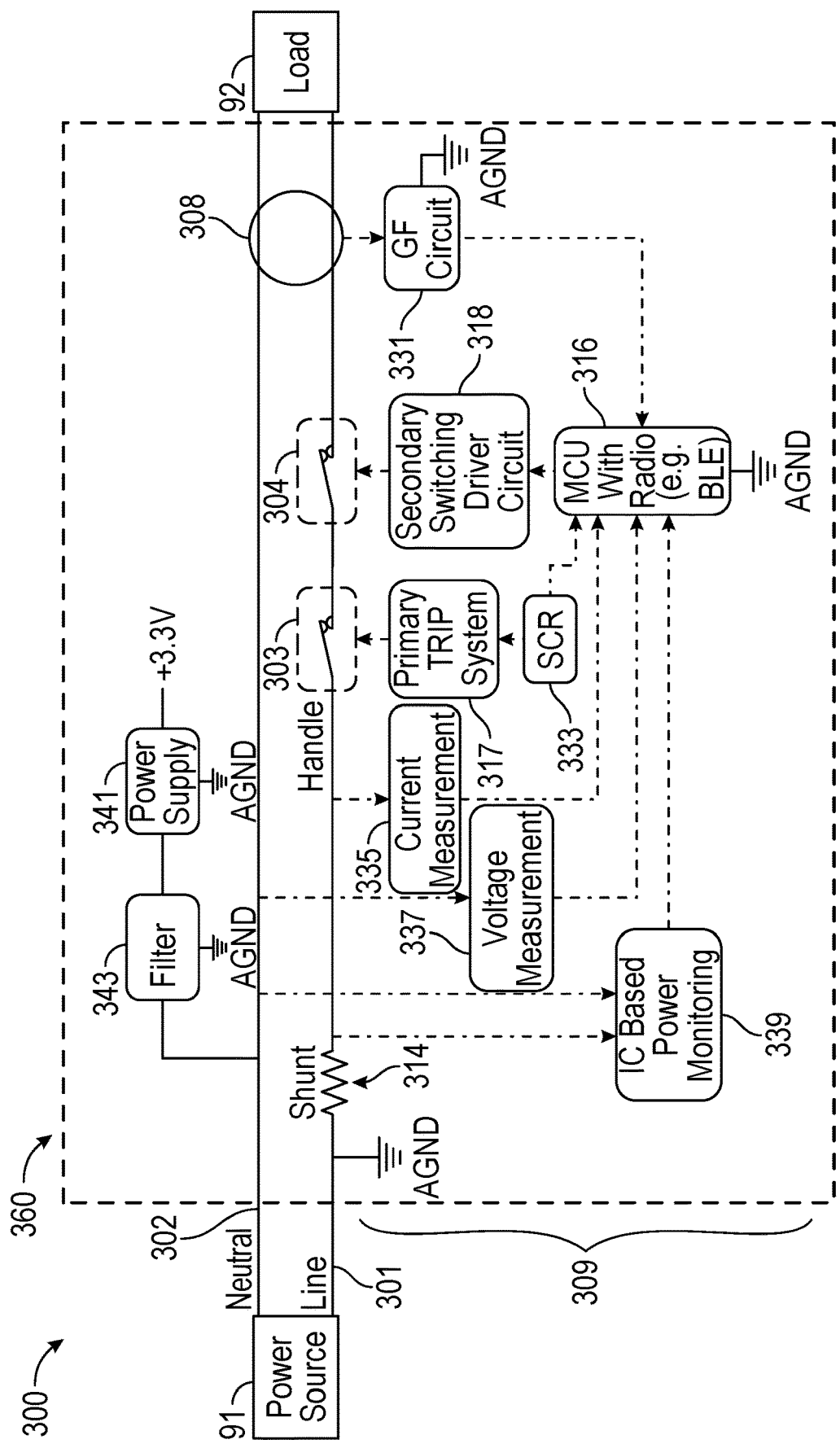
FIG. 3 is a schematic diagram of a circuit breaker with two disconnect devices in series and a smart monitoring system, in accordance with another exemplary embodiment of the disclosed concept.

The present disclosure is directed to embodiments of a circuit interrupter (e.g. without limitation, a circuit breaker) comprising at least one disconnect mechanism and a smart monitoring system that is configured to actuate the at least one disconnect mechanism in a manner that more efficiently handles fault clearance and load switching. FIG. 1 is a schematic diagram of a circuit breaker 100 comprising multiple disconnect mechanisms connected in series and a smart monitoring system configured to selectively actuate each of the multiple disconnect mechanisms, in accordance with an exemplary embodiment of the disclosed concept. FIG. 2 is a schematic diagram of a circuit interrupter 200 with a single disconnect mechanism and a smart monitoring system configured to selectively actuate the single disconnect mechanism, in accordance with another exemplary embodiment of the disclosed concept. FIG. 3 is a schematic diagram of a circuit interrupter 300 with two disconnect mechanisms connected in series and a smart monitoring system configured to selectively actuate each of the disconnect mechanisms, in accordance with an exemplary embodiment of the disclosed concept. While the circuit breakers shown in FIGS. 1-3 are 1-pole circuit breakers, it should be noted that the smart monitoring systems disclosed in connection with the figures can be used with multi-pole circuit breakers as well, as detailed later herein.

The circuit breaker 100 shown in FIG. 1 includes one pole assembly 160 and is structured to be connected between a between a power source 91 and at least one load 92 via a line conductor 101 and a neutral conductor 102, and comprises a primary disconnect device 103 (referred to hereinafter as a "primary disconnect 103" for brevity) and at least one secondary disconnect device 104 (referred to hereinafter as a "secondary disconnect 104" for brevity) connected in series between the power source 91 and load 92, with the secondary disconnect 104 being positioned on the load side of the primary disconnect 103. For ease of illustration, only one secondary disconnect 104 is shown in FIG. 1, but it is noted that the circuit breaker 100 can comprise additional secondary disconnects 104 that are functionally identical to the secondary disconnect 104 shown in FIG. 1, such that the circuit breaker 100 can function as a main circuit breaker.

When the circuit breaker 100 does include more than one secondary disconnect 104, each secondary disconnect 104 is configured similarly to the secondary disconnect 104 shown in FIG. 1, such that additional branches of the line and load conductors 101, 102 are provided on the load side of the primary disconnect 103, and each additional secondary disconnect 104 is connected between the load side of the primary disconnect 103 and a corresponding load terminal to which an additional load 92 can be connected. That is, when the circuit breaker 100 comprises multiple secondary disconnects 104, each secondary disconnect 104 is connected in series with the primary disconnect 103 such that a plurality of loads 92 (corresponding in number to the multiple secondary disconnects 104) can be supplied with power by the circuit breaker 100.

While the primary disconnect 103 is depicted as a mechanical device and the secondary disconnect 104 is depicted as an electronic device in FIG. 1, it is noted that the primary disconnect 103 and the secondary disconnect 104 can instead comprise devices of types other than the types depicted in FIG. 1 without departing from the scope of the disclosed concept. For example and without limitation, the primary disconnect 103 can instead comprise a solid state disconnect or a short circuit clearing electronic disconnect.

The primary disconnect 103 and each of the secondary disconnects 104 can be actuated between a closed state which allows current flow and an open state which prevents current flow, with the primary disconnect 103 and each of the secondary disconnects 104 being operated independently of one another. When the primary disconnect 103 is closed, any load 92 whose corresponding secondary disconnect 104 is closed is electrically connected to the power source 91, and any load 92 whose corresponding secondary disconnect 104 is open is electrically isolated from the power source 91. When the primary disconnect 103 is open or tripped, all of the loads 92 are electrically isolated from the power source 92 regardless of whether the corresponding secondary disconnects 104 are closed or open. Under normal operating conditions, the primary disconnect 103 and secondary disconnects 104 are closed. The conditions that lead to the primary disconnect 103 and/or the secondary disconnect(s) 104 being opened are detailed later herein in conjunction with FIG. 5.

A number of current sensors 106 are positioned to sense current flowing through the line and/or neutral conductors 101 and 102, and for each secondary disconnect 104 included in the circuit breaker 100, a current transformer 108 is used to sense current flowing through the load 92 corresponding to the secondary disconnect 104. A smart monitoring system 109 monitors the operating conditions (for example and without limitation, current and voltage levels) within the circuit breaker 100 using the output from the current sensors 106, current transformers 108, and other devices as noted later herein. It will be appreciated that several types of devices suitable for monitoring operating conditions within a circuit interrupter are known. The monitoring devices (e.g. the current sensors 106 and current transformer 108) shown in FIG. 1 are included as non-limiting illustrative examples of such monitoring devices, but it should be noted that other components (for example and without limitation, voltage sensors) suitable for monitoring operating conditions within a circuit breaker can be included in the circuit breaker 100 without departing from the scope of the disclosed concept.

The smart monitoring system 109 includes a sensor module 110, a power supply and sensing network 112 (referred to hereinafter as the "power sensing network 112" for brevity), a controller 116, a primary disconnect trip system 117, secondary disconnect driving circuitry 118, a power monitoring/metering module 121 (referred to hereinafter as the "power monitoring module 121" for brevity), and a communication module 123. The sensor module 110 receives output from the current sensors 106 and is in communication with the controller 116, and the power sensing network 112 receives output from the current transformer 108. The circuit breaker 100 also includes a shunt element 114 that enables the circuit breaker 100 to be tripped remotely, and the power sensing network 112 also receives input from the shunt element 114 that informs the power sensing network 112 when the circuit breaker 100 has been tripped remotely by the shunt element 114. The power sensing network 112 provides input to the controller 116, the primary disconnect trip system 117, the secondary disconnect driving circuitry 118, and the power monitoring/metering module 121.

The power monitoring module 121 receives input from the power sensing network 112 and is in communication with the communication module 123 and the controller 116. The communication module 123 is in communication with the controller 116, and is also configured to be in communication with an external device and/or software application, such as a mobile phone app. The communication module 123 can communicate with the controller 116 via serial communication link, for example and without limitation. The communication module 123 enables a user to both remotely receive performance information about the circuit breaker 100 and to provide commands to the controller 116, as will be detailed further herein in connection with the fault handling method 400 shown in FIG. 5.

As detailed above here, the controller 116 receives input from a variety of sources and is configured to selectively actuate the primary disconnect trip system 117 and the secondary disconnect driving circuitry 118 based on the inputs received from, for example and without limitation, the sensor module 110, the power sensing network 112, the power monitoring/metering module 121, and the communication module 123. Actuating the primary disconnect trip system 117 causes the primary disconnect 103 to trip open the entire circuit breaker 100, and actuating the secondary disconnect driving circuitry 118 causes the corresponding secondary disconnect(s) 104 to disconnect the corresponding loads 92 from the power source 91. The logic utilized by the controller 116 to determine whether to actuate the secondary disconnect driving circuitry 118 or the primary disconnect trip system 117 is detailed further later herein in connection with FIG. 5, which shows a flow chart of the fault handling method 400 used by the controller 116.

The circuit breaker 200 shown in FIG. 2 includes one pole assembly 260 and is structured to be connected between a power source 91 and a load 92 via a line conductor 201 and a neutral conductor 202. In contrast with the circuit breaker 100, the circuit breaker 200 comprises only one disconnect mechanism, a primary disconnect mechanism 203. While the primary disconnect 203 is depicted as a mechanical device in FIG. 2, it is noted that the primary disconnect 203 can instead comprise a different type of device, such as a solid state disconnect or a short circuit clearing electronic disconnect for example and without limitation, without departing from the scope of the disclosed concept. The circuit breaker 200 includes many components that are functionally equivalent or similar to the components of the circuit breaker 100, and each component of the circuit breaker 200 that corresponds to a component of the circuit breaker 100 is accordingly numbered with a reference number that increments by 100 the reference number of the corresponding component of the circuit breaker 100. For example and without limitation, the circuit breaker 200 includes a shunt element 214 that enables the circuit breaker 200 to be actuated remotely, similarly to how the shunt element 114 enables the circuit breaker 100 to be actuated remotely. For the sake of brevity, those components of the circuit breaker 200 that correspond to elements of the circuit breaker 100 are not explained in detail and should be understood to function equivalently to the corresponding elements of the circuit breaker 100.

Due to the circuit breaker 200 not including a secondary disconnect, the circuit breaker 200 includes a primary disconnect open/close system 219 configured to actuate load switching in low severity fault conditions so that the load 92 can be temporarily disconnected from the power source 91 without tripping the entire circuit breaker 200. As detailed further later herein in conjunction with FIG. 5, when the primary disconnect 203 is closed, actuating the primary disconnect open/close system 219 to temporarily disconnect the load 92 from the power supply 91 enables the load 92 to be reconnected to the power supply 91 after resolution of the fault without requiring manual intervention.

The circuit breaker 300 shown in FIG. 3 includes one pole assembly 360 and is structured to be connected between a power source 91 and a load 92 via a line conductor 301 and a neutral conductor 302, and additionally has ground fault detection capability. The circuit breaker 300 includes some components that are functionally equivalent or similar to the components of the circuit breaker 100, and each component of the circuit breaker 300 that corresponds to a component of the circuit breaker 100 is accordingly numbered with a reference number that increments by 200 the reference number of the component of the circuit breaker 100. For example and without limitation, the circuit breaker 300 includes a shunt element 314 that enables the circuit breaker 300 to be actuated remotely, in the same manner in which the shunt element enables the circuit breaker 100 to be actuated remotely. For the sake of brevity, those components of the circuit breaker 300 that correspond to elements of the circuit breaker 100 are not explained in detail and should be understood to function equivalently to the corresponding elements of the circuit breaker 100.

The primary disconnect 303 is labeled as a "handle" in FIG. 3, in order to denote that the primary disconnect 303 corresponds to a physical handle on the exterior of the circuit breaker. The primary disconnects 103, 203 of the circuit breakers 100, 200 also correspond to an exterior physical handle. The exterior handle is detailed further later herein in connection with the method 400 depicted in FIG. 5. The circuit breaker 300 includes a primary trip system 317 and a secondary switching driver circuit 318 that correspond to the primary disconnect trip system 117 and secondary disconnect driving circuitry 118 of the circuit breaker 100. The primary trip system 317 and secondary switching driver circuit 318 are labeled as such in the figure due to naming conventions used with certain types of electronics; however, the primary trip system 317 may also be referred to herein as the "primary disconnect trip system 317" and the secondary switching driver circuit 318 may also be referred to herein as the "secondary disconnect driving circuitry 318", particularly when the components of the circuit breaker 300 are being referenced in conjunction with the with the components of the circuit breaker 100.

The circuit breaker 300 comprises a controller 316 that is a microcontroller (MCU) having a radio transmitter/receiver. In one non-limiting exemplary embodiment, the radio transmitter/receiver is a Bluetooth low energy (BLE) antenna, which uses relatively little power consumption for a given communication range and enables the controller 316 to communicate easily with a user's mobile phone or other communication device. However, BLE capability is provided solely as an illustrative example of a communication network that can be implemented and is intended to be non-limiting, and it should be noted that the controller 316 can use communication networks other than BLE without departing from the scope of the disclosed concept. The circuit breaker 300 also includes a ground fault detection circuit 331 that receives the output of current transformer 308 and provides input to the controller 316. The ground fault detection circuit 331 also includes self-test capability such that the functioning of the ground fault detection circuit can be tested under simulated fault conditions, which can be actuated by the controller 316. A silicon-controlled rectifier (SCR) 333 is connected between the controller 316 and the primary trip system 317 and configured to receive input from the controller 316. It is noted that SCRs such as the SCR 333 are known for the ability to switch high magnitude current on and off in medium and high voltage applications. For applications in which redundancy is desired to safeguard against a failure of the primary trip system 317, the circuit breaker 300 can further include a second SCR 333 and a second primary trip system 317 configured in the same manner as the SCR 333 and primary trip system 317 shown in FIG. 3, i.e. such that the second primary trip system 317 is also operably connected to the primary trip disconnect 303 in order to open the primary trip disconnect 303, with the second SCR being connected between the controller 316 and the primary trip system 317 and being configured to receive input from the controller 316.

Still referring to FIG. 3, a current measurement module 335, a voltage measurement module 337, and an integrated circuit (IC) power monitoring module 339 are used to respectively monitor current, voltage, and power through the circuit breaker 300. The current measurement module 335 can comprise any device suitable for measuring current in a circuit breaker, the voltage measurement module 337 can comprise any device suitable for measuring voltage in a circuit breaker, and the IC power monitoring module 339 can comprise any IC type device suitable for measuring power in a circuit breaker. The current measurement module 335, the voltage measurement module 337, and the IC based power monitoring module 339 all provide input to the controller 316. In addition, a power supply 341 and a filter 343 are included in the circuit breaker 300 in order to steadily power the controller 316 and the sensing circuits (for example and without limitation, the ground fault detection circuit 331), and to provide energy for the radio in the controller 316 to communicate. Providing the filter 343 in conjunction with the power supply 341 protects against voltage surges (abnormally high voltages) that can damage the power supply 341 or sensing components.

As previously noted, the smart monitoring systems disclosed in connection with FIGS. 1-3 can be used with multi-pole circuit breakers. As used hereafter, when the phrase "controller and communication device" is used in connection with one of the circuit breakers 100, 200, 300, the phrase refers to the controller 116 and communication module 123 for the circuit breaker 100, to the controller 216 and communication module 223 for the circuit breaker 200, and to the controller 316 for circuit breaker 300. In the multi-pole embodiment of each of the circuit breakers 100, 200, 300, each pole assembly 160, 260, 360 includes its own designated set of the components shown in FIGS. 1-3, although there does not have to be a one-to-one ratio of controllers and communication devices to pole assemblies 160, 260, 360. More specifically, the multi-pole embodiments of the circuit breakers 100, 200, 300 include a number of controllers and communication devices, and the circuit breaker 100, 200, 300 can be configured such that the number of controllers and communication devices can be common to all poles 160, 260, 360, or such that each given pole 160, 260, 360 can have a number of controllers and communication devices dedicated to the given pole. In a multi-pole embodiment of the circuit breaker 100, 200, 300 where the number of controllers and communication devices are common to all of the pole assemblies 160, 260, 360, the number of controllers and communication devices receive inputs from and transmit signals to the same components as previously described in conjunction with FIGS. 1-3, but instead of only receiving input from and transmitting signals to one set of components in a single pole assembly 160, 260, 360, the number of controllers and communication devices receive inputs from and transmit signals to multiple sets of components (the multiple sets of components corresponding in number to the number of pole assemblies 160, 260, 360).

As will be apparent later from the discussion of the fault handling method 400 depicted in FIG. 5, with regard to the circuit breakers 100, 300, a number of device types are suitable for use as the primary disconnect 103, 303 provided that the secondary disconnect 104, 304 has short circuit withstand capacity and provided that the primary disconnect 103, 303 has short circuit clearing capability. In an exemplary embodiment of the disclosed concept, the primary disconnect 103, 303 has a short circuit fault clearing capacity of up to 22 kiloamps interrupting capacity (kAIC), the the circuit interrupter 100, 300 can include an arc plate and bypass wire that augment the short circuit fault clearing capacity of the primary disconnect 103, 303. With regard to the circuit interrupter 200, in an exemplary embodiment of the disclosed concept, the primary disconnect 203 has a short circuit fault clearing capacity of up to 22 kAIC, and the circuit interrupter 200 can include an arc plate and bypass wire that augment the short circuit fault clearing capacity of the primary disconnect 203

It will be appreciated that circuit breakers include a variety of features depending on the particular applications in which they are employed. The circuit breakers 100, 200, and 300 shown in FIGS. 1-3 are provided as illustrative examples of the varying configurations that different circuit breakers can have in different applications, such as multiple disconnect (circuit breakers 100 and 300), single disconnect (circuit breaker 200), and ground fault monitoring (circuit breaker 300). While the embodiments shown in FIGS. 1, 2, and 3 can be distinguished from one another in certain respects, all three embodiments include a smart monitoring module 109, 209, or 309 that represents an improvement over existing electronic monitoring technology known in the relevant field. The circuit breakers 100, 200, 300 shown in FIGS. 1, 2, and 3 are included to provide illustrative examples of how the disclosed smart monitoring modules 109, 209, 309 can be implemented in various types of circuit interrupters, including for example and without limitation: main breakers, sub feed breakers, or branch breakers, said breakers having any number of poles and having either a single disconnect or multiple disconnects, with the disconnect(s) being either single contact-based, dual contact-based, multiple contact-based, or semiconductor-based, or being some other means of disconnect.

Figure 4:
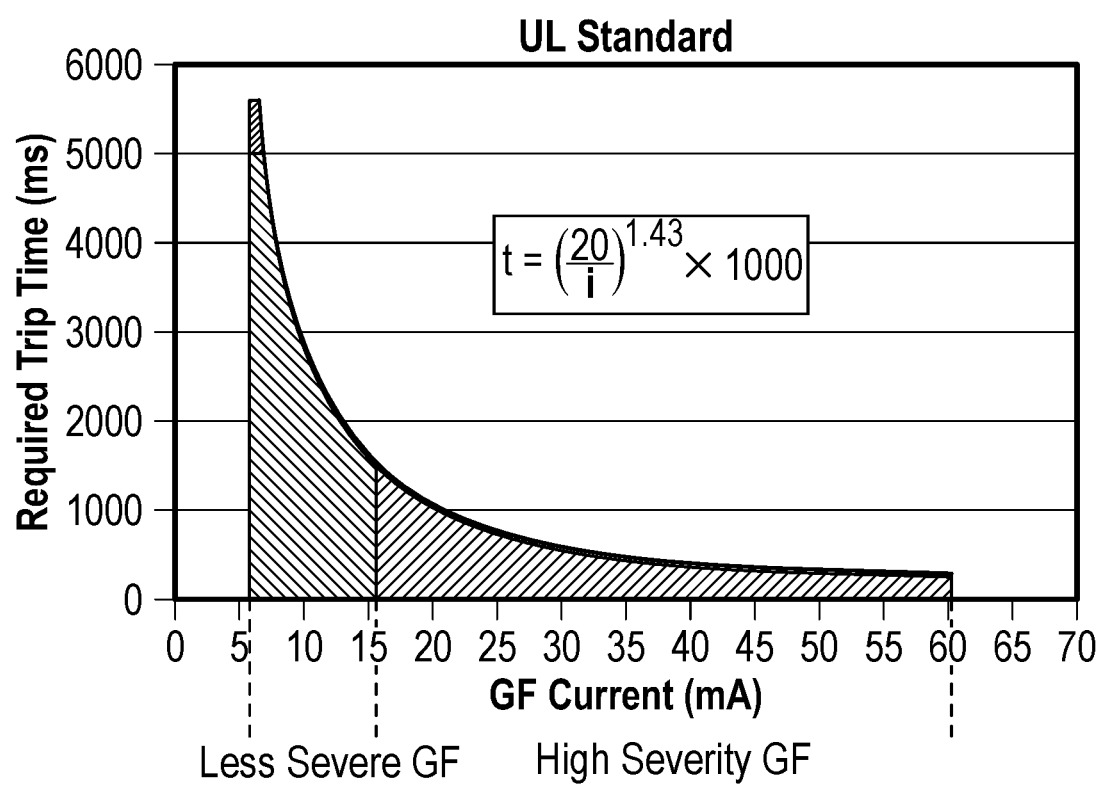
FIG. 4 is a current trip curve showing the current levels for less severe ground faults and high severity ground faults under UL standards.

Prior to discussing the innovative features of the present disclosure, it is noted that several types of faults occur in circuit interrupters, and that there are several categories within each type of fault. For example and without limitation, common types of faults include: arc faults, ground faults, short circuit faults, and overload faults. In addition, common categories of faults include, for example and without limitation: nuisance/non-continuous, low severity, high severity, and safety (i.e. continuous low severity). In FIG. 4, a ground fault (GF) trip curve is shown in order to provide one non-limiting illustrative example of how low severity fault currents are differentiated from high severity fault currents, in accordance with the standards set by Underwriters Laboratory (UL). In the GF trip curve of FIG. 4, trip time is plotted on the y-axis as a function of fault current magnitude plotted on the x-axis. As denoted by the GF trip curve, current up to a certain threshold is considered low severity, while current exceeding that threshold is considered high severity. Low severity fault current levels are permitted to persist for longer durations of time than high severity fault current levels.

Figure 5:
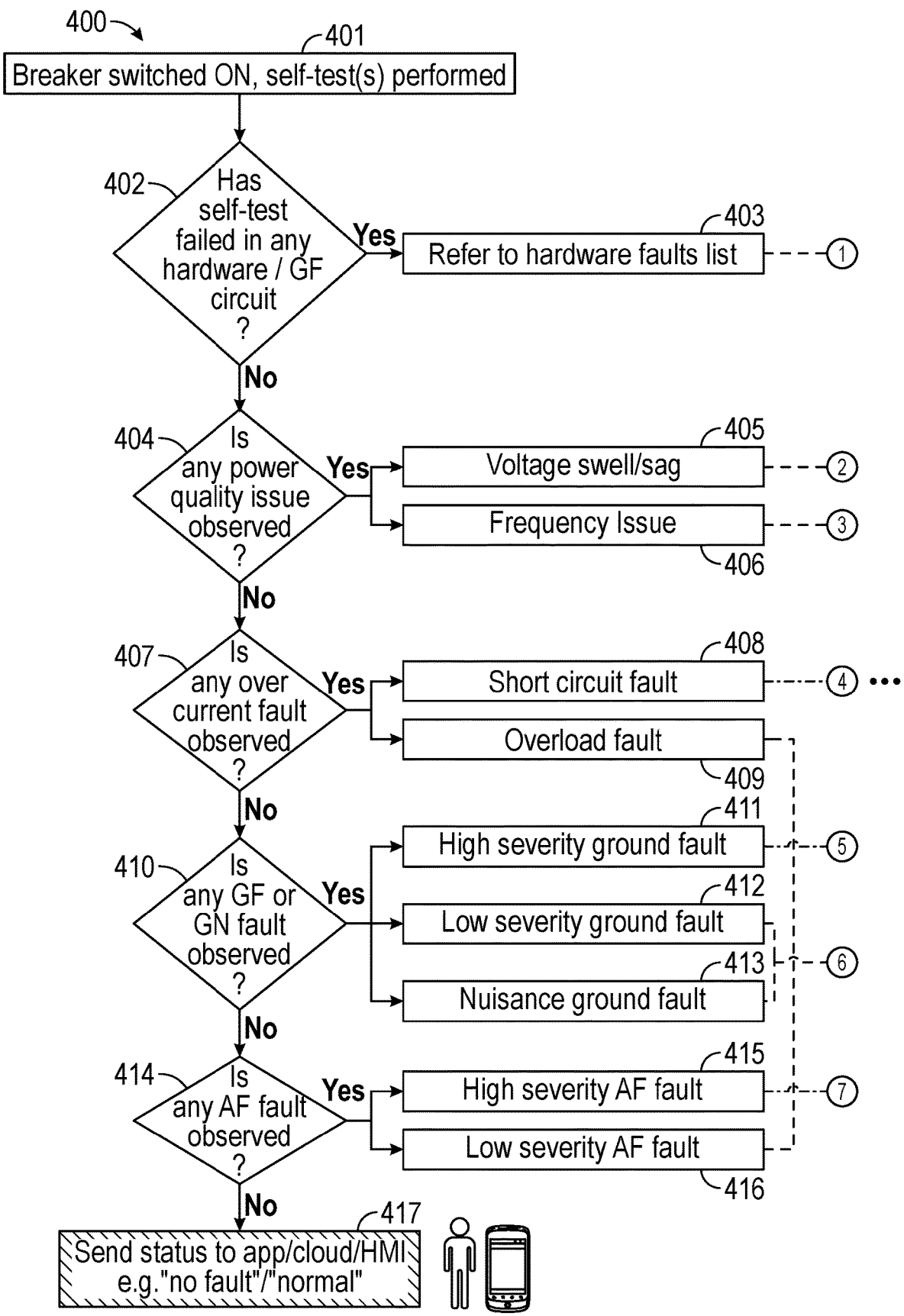
FIG. 5 is a flow chart of a fault handling method that the smart monitoring systems of the circuit interrupters depicted in FIGS. 1-3 execute to address and minimize the impact of fault conditions, in accordance with an exemplary embodiment of the disclosed concept.
Figure 5:
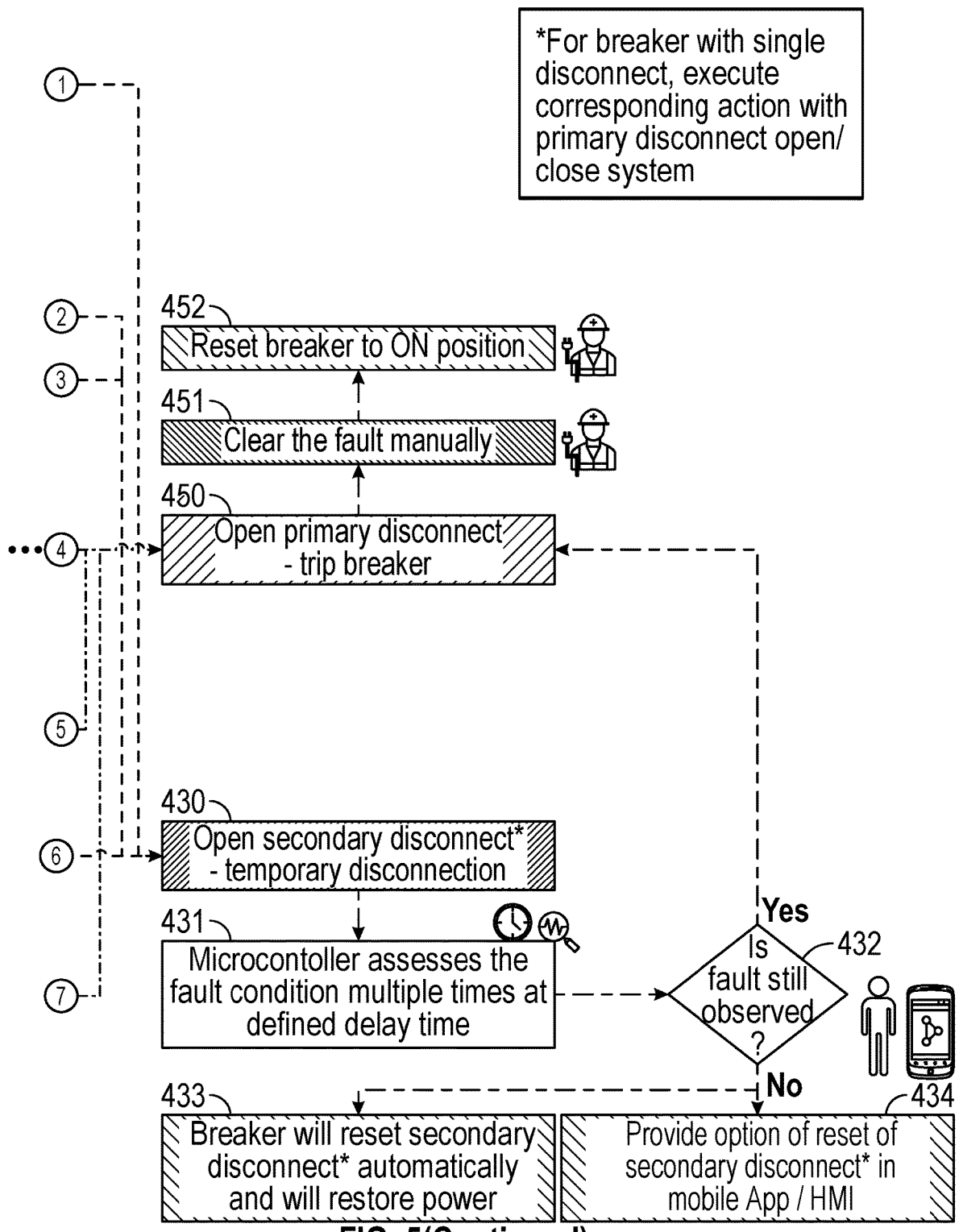

Referring now to FIG. 5, a flow chart of a fault handling method 400 that can be used to assess fault conditions in a circuit interrupter and prevent or minimize damage arising therefrom is shown, in accordance with an example embodiment of the disclosed concept. The fault handling method 400 of FIG. 5 may be employed, for example, by the smart monitoring systems 109, 209, and 309 of the circuit breakers 100, 200, 300 shown in FIGS. 1-3 and is described in conjunction with the circuit breakers 100, 200, 300 shown in FIG. 103. However, it will be appreciated that the fault handling method 400 may be employed in other devices as well without departing from the scope of the disclosed concept. For ease of explanation, the fault handling method 400 is first detailed in conjunction with the circuit breakers 100 and 300 in order to explain how the method 400 can be implemented in a circuit interrupter having multiple disconnects connected in series. An explanation of how the fault handling method 400 can be implemented in a circuit interrupter with only a single disconnect, such as the circuit breaker 200, is provided afterward. As an initial matter, it is noted that certain paths in the flow chart are labeled with one of the numbers 1, 2, 3, 4, 5, 6, or 7 for the purpose of making the paths easier to follow visually, as FIG. 5 spans multiple drawing sheets.

The fault handling method 400 starts at step 401, when the circuit breaker 100, 300 is powered on and the smart monitoring system 109, 309 performs a self-test of any hardware in the circuit breaker 100, 300 for which the smart monitoring system 109, 309 is configured to perform a self-test upon powering on of the circuit breaker 100, 300. Such hardware can include, for example and without limitation, the primary disconnect trip systems 117, 317, the secondary disconnect driving circuitry 118, 318, and the ground fault circuit 331. The primary disconnects 103, 303 and secondary disconnects 104, 204 are all presumed to be closed when the circuit breaker 100, 300 is powered on at step 401. At step 402, the controller 116, 316 determines if any self-test performed at step 401 has yielded a failure result. If any self-test did yield a failure result, the method proceeds to step 403, where the controller 116, 316 identifies the specific type of failure(s) that occurred during step 402. A non-limiting example list of hardware faults that can be identified at step 403 is provided in FIG. 6. The method then proceeds to step 430, wherein the secondary disconnect 104, 304 is opened. Step 430 is detailed further later herein after step 417.

Referring again to step 402, if the self-test(s) of the hardware circuitry performed at step 401 did not yield any failure results, then the method proceeds from step 402 to step 404, wherein the controller 116, 316 checks to see if any power quality issues have occurred. If so, the controller 116, 316 identifies the specific type power quality issue observed during step 404 as being either: a voltage swell or sag at step 405, or a frequency issue at step 406. The method then proceeds to step 430 (detailed further later herein), wherein the secondary disconnect 104, 304 is opened.

Referring again to step 404, if no power quality issue is observed, then the method proceeds from step 404 to step 407, wherein the controller 116, 316 checks to see if any overcurrent fault has occurred. If so, the controller 116, 316 identifies the specific type of overcurrent fault as being either: a short circuit fault at step 408, or an overload fault at step 409. If the fault is determined to be a short circuit fault at step 408, the method then proceeds to step 450, wherein the primary disconnect 103, 303 is actuated in order to trip the circuit breaker 100, 300 open. Step 450 is detailed further later herein, after steps 430-434. If the fault is determined to be an overload fault at step 409, the method then proceeds to step 430 (detailed further later herein), wherein the secondary disconnect 104, 304 is actuated in order to disconnect a selected load 92 or loads 92 from the power source 91.

Referring once more to step 407, if no overcurrent fault is observed, then the method proceeds from step 407 to step 410, wherein the controller 116, 316 checks to see if any ground-type fault, i.e. either a ground fault or a ground to neutral (GN) fault, has been observed. If so, the controller 116, 316 determines the severity of the ground-type fault observed during step 410 as being either: a high severity ground fault at step 411, a low severity ground fault at step 412, or a nuisance ground fault at step 413. If the ground-type fault is determined to be high severity at step 411, the method then proceeds to step 450 (detailed further later herein), wherein the primary disconnect 103, 303 is actuated in order to trip the circuit breaker 100, 300 open. If the ground-type fault is determined to be low severity at step 412 or nuisance at step 413, the method then proceeds to step 430 (detailed further later herein), wherein the secondary disconnect 104, 304 is actuated in order to disconnect a selected load 92 or loads 92 from the power source 91.

Referring again to step 410, if no ground-type fault is observed, then the method proceeds from step 410 to step 414, wherein the controller 116, 316 checks to see if an arc (AF) fault has been observed. If so, the controller 116, 316 determines the severity of the arc fault observed during step 414 as being either: a high severity arc fault at step 415, or a low severity arc fault at step 416. If the arc fault is determined to be high severity at step 415, the method then proceeds to step 450 (detailed further later herein), wherein the primary disconnect 103, 303 is actuated in order to trip the circuit breaker 100, 300 open. If the arc fault is determined to be low severity at step 416, the method then proceeds to step 430 (detailed further later herein), wherein the secondary disconnect 104, 304 is actuated in order to disconnect a selected load 92 or loads 92 from the power source 91.

Referring again to step 414, if no AF fault is observed, then the method proceeds from step 414 to step 417, wherein the controller 116, 316 actuates transmittal of a "normal status" message to the user indicating that the circuit breaker 100, 300 is operating normally. The normal status message can be transmitted, for example and without limitation, to user's mobile phone app, to a software cloud, or to a human machine interface (HMI). The fault handling diagnostic 400 runs continuously while the circuit breaker 100, 300 is in operation such that, if the method progresses to step 417 during the first iteration of the method after powering on of the circuit breaker 100, 300, the method then returns to step 402 and iterates through the steps as detailed above. Starting with the second iteration of the method 400, for any iteration of the method that progresses to step 417, the subsequent iteration of the method will start with step 402.

Referring now to step 430, the secondary disconnect 104, 304 is actuated to open (e.g. as a result of the controller 116, 316 instructing the secondary disconnect driving circuitry 118, 318 to actuate the secondary disconnect 104, 304) under minor fault conditions in which the fault observed during an earlier step of the method 400 is considered to be low severity, nuisance, and/or transient in nature. Under such minor fault conditions, tripping open the entire circuit breaker 100, 300 may not be necessary, so the secondary disconnect 104, 304 is opened while the primary disconnect 103, 303 is kept closed. The method then proceeds from step 430 to step 431, in which the controller 116, 316 continues to monitor the conditions in the breaker 100, 300 in order to assess the ongoing status of the fault condition. Specifically, for each type of fault condition that can lead to the secondary disconnect 104, 304 being opened at step 430, the controller 116, 316 is configured to wait some predetermined amount of time (referred to as a "delay time") before taking further action, with the delay time being defined to correspond to the type of fault condition observed. During this delay time, the controller 116, 316 assesses the status of the fault condition multiple times. After the delay time has elapsed, the method proceeds to step 432.

At step 432, if the fault condition has ceased to exist and conditions in the circuit breaker 100, 300 have returned to normal within the delay time, the method proceeds to either step 433 or 434, depending on how a user has elected to operate the circuit breaker 100, 300. If the user has elected to enable the breaker 100, 300 to not require user review after step 432, then the method proceeds from step 432 to step 433 so that the circuit breaker 100, 300 can automatically reset (i.e. re-close) the secondary disconnect 104, 304. In contrast, if the user has elected to require user review after step 432, then the method proceeds from step 432 to step 434 so that the user receives a notification that the secondary disconnect 104, 304 can safely be reset/re-closed, enabling the user to actuate reset/re-closing of the secondary disconnect 104, 304 via, for example and without limitation, a mobile phone app or HMI. At step 432, if the fault condition has not ceased to exist and conditions within the circuit breaker 100, 300 do not return to normal within the delay time, the method proceeds to step 450.

Referring now to step 450, the primary disconnect 103, 303 is actuated to open (e.g. as a result of the controller 116, 316 instructing the primary disconnect trip system 117, 317 to actuate the primary disconnect 103, 303) under conditions in which the fault observed during an earlier step of the method is considered to be high severity in nature. Under such fault conditions, it is considered necessary to trip open the entire breaker 100, 300 in order to prevent severe or irreparable damage from occurring. The method then proceeds from step 450 to step 451, during which a user must manually clear the fault, i.e. inspect the circuit breaker 100, 300 in order to assess what factors may have caused the fault condition and resolve such factors or de-commission the circuit breaker 100, 300. If the fault conditions get resolved, the method then proceeds to step 452, wherein the user manually resets/re-closes the primary disconnect 103, 303 such that the circuit breaker 100, 300 is reinstated to its ON position. As previously noted, a number of device types are suitable for use as the primary disconnect 103, 303, provided that the secondary disconnect 104, 304 has short circuit withstand capacity (in order to withstand steps 430-434), and provided that the primary disconnect 103, 303 has short circuit clearing capability (in order to withstand steps 450-452).

Prior to detailing how the fault handling method 400 is implemented in the circuit breaker 200, it should be noted that for all three circuit breakers 100, 200, 300, a physical handle on the exterior of the circuit breaker corresponds to the primary disconnect 103, 203, 303, such that actuation of the primary disconnect 103, 203, 303 by the respective primary disconnect trip systems 117, 217, 317 consequently causes a change in the position of the exterior handle. The primary disconnects 103, 203, and 303 are all configured to be actuated between a closed state (corresponding to current being able to flow and to the exterior handle being in an ON position), an open state (corresponding to current being unable to flow and to the exterior handle being in an OFF position), and a tripped state (corresponding to current being unable to flow and to the exterior handle being in a TRIP position). The primary disconnect 103, 203, 303 can comprise, for example and without limitation, an electromagnetic device (such as a solenoid) or a solid state disconnect device or a short circuit clearing electronic disconnect device.

Regardless of what type of device the primary disconnect 103, 203, 303 comprises, actuation of the primary disconnect 103, 203, 303 by the respective primary disconnect trip system 117, 217, 317 consequently actuates movement of the exterior handle from the ON position to the TRIP position, with an indication of the TRIP status being provided to the user. After the fault has been manually cleared and assessed by electrotechnical personnel, the breaker handle can be moved from TRIP to OFF and then from OFF to ON. This process is generally referred to as a RESET of the circuit breaker 100, 200, 300 to ON. It is noted that the architecture and handle position alignment for a specific breaker 100, 200, 300 can vary somewhat from the TRIP and RESET processes described above. For example and without limitation, the circuit breaker 100, 200, 300 can be designed with the handle position being the same for both the TRIP and the OFF state such that the handle moves to the OFF position when the primary disconnect 103, 203, 303 is tripped, and such that the RESET process simply comprises moving the breaker handle from the OFF state to the ON state after the fault has been manually cleared and assessed by electrotechnical personnel.

It will be appreciated that, due to the circuit breaker 200 having only one disconnect (the primary disconnect 203) rather than multiple disconnects, steps 430-434 and 450-452 of the fault handling method 400 are implemented slightly differently in the circuit breaker 200 than they are in the circuit breakers 100, 300. In particular, rather than differentiating between a primary disconnect and a secondary disconnect in order to implement steps 430-434 with the secondary disconnect and to implement steps 450-452 with the primary disconnect, steps 430-434 are implemented in the circuit breaker 200 by actuating the primary disconnect 203 with the primary disconnect open/close system 219 (as noted by the asterisks included in steps 430, 433, 434 in FIG. 5) and steps 450-452 are implemented by actuating the primary disconnect with the primary disconnect trip system 217.

Thus, in order to temporarily disconnect the load 92 connected to the circuit breaker 200 at step 430, the primary disconnect 203 is opened via the primary disconnect open/close system 219 for the duration of the delay time. Steps 431 and 432 are performed in the same manner as previously described for the circuit breakers 100, 300. At step 432, if the fault condition has ceased to exist and conditions in the circuit breaker 200 have returned to normal within the delay time, then step 433 or 434 is performed by re-closing the primary disconnect 203 via the primary disconnect open/close system 219. Specifically, if the circuit breaker 200 is configured to perform step 433, then the controller 216 is configured to automatically actuate the primary disconnect open/close system 219 to reset (i.e. re-close) the primary disconnect 203. In contrast, if the circuit breaker 200 is configured to instead perform step 434 because the user has elected to require user review after step 432, then the controller 216 is configured to transmit a notification to the user that the primary disconnect 103 can safely be reset/re-closed, enabling the user to input a command (for example and without limitation, via a mobile phone app or HMI) to the controller 216 to actuate reset/re-closing of the primary disconnect 103 with the primary disconnect open/close system 219.

However, if at step 432 the conditions within the circuit breaker 200 have not returned to normal within the delay time, when the method proceeds to step 450, the controller additionally actuates the primary disconnect trip system 217 to trip the primary disconnect 203 to the TRIP state. Although the primary disconnect 203 was already open due to actuation by the primary disconnect open/close system 219 at step 430, actuating the primary disconnect trip system 217 at 450 imposes the additional requirement of manual intervention to reset the primary disconnect 203 to the ON position. Specifically, after the method progresses to step 451 and the user manually clears the fault, then the user must both manually reset/re-close the primary disconnect 203 such that the circuit breaker 200 is reinstated to its ON position. As previously noted, a number of device types are suitable for use as the primary disconnect 203, and provided that the primary disconnect 203 has short circuit clearing capability (in order to withstand steps 450-452).

With regard to those circuit breakers disclosed herein having multiple disconnects connected in series, i.e. the circuit breakers 100, 300, it should be noted that there are different processes for resetting the primary disconnects 103, 303 and resetting the secondary disconnects 104, 304. Specifically, the primary disconnects 103, 303 must be manually reset/re-closed by a user moving a handle from an OFF/TRIP position to an ON position, while the circuit breakers 100, 300 can be configured in one of two manners to enable the secondary disconnects 104, 304 to be reset from an OFF position to an ON position. If the circuit breaker 100, 300 is configured in a first manner, then the controller 116, 316 is configured to automatically send a power signal to the secondary driving circuitry 118, 318 to reset the secondary disconnect 104, 304 after the fault condition is resolved (i.e. after step 432 of the method 400). If the circuit breaker 100, 300 is configured in a second manner, then the circuit breaker 100, 300 requires some type of user input to reset the secondary disconnect 104, 304 such that the user must provide a command through a software application such as a mobile phone app or through an HMI.

With regard to the circuit breaker 200, which only has one primary disconnect 203, the primary disconnect 203 can be configured in one of two manners to enable the primary disconnect 203 to be restored to the closed state after being actuated to the open state by the primary disconnect open/close system 219. If the circuit breaker 200 is configured in a first manner, then the controller 216 is configured to automatically send a power signal to the primary disconnect open/close system 219 to reset the primary disconnect 203 after the fault condition is resolved (i.e. after step 432 of the method 400). If the circuit breaker 200 is configured in a second manner, then the circuit breaker 200 requires some type of user input to reset the primary disconnect 203 such that the user must either move a manual override lever located on the exterior of the circuit breaker 200 or such that the user must provide a command through a software application such as a mobile phone app.

Figure 7:
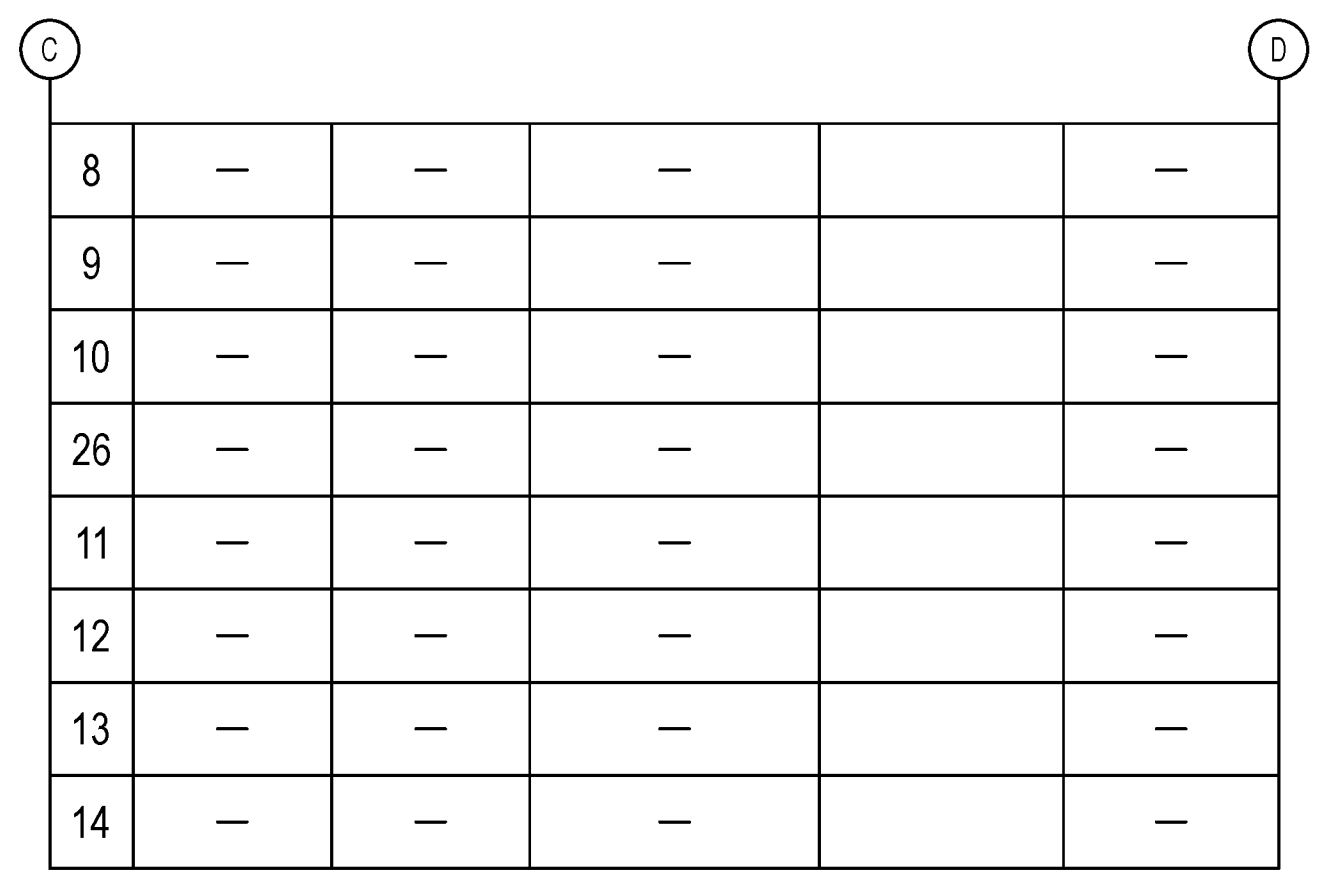

Referring now to FIG. 7, a table 500 is provided to detail how 30 unique operating conditions are handled by a circuit breaker with multiple disconnects connected in series (such as the circuit breakers 100 and 300) that executes the fault handling method 400, in accordance with exemplary embodiments of the disclosed concept. It will be appreciated that the events detailed in the table 500 can be adapted for use with a single disconnect system such as the circuit breaker 200, in accordance with the previously discussed adaptation of steps 430-434 of the fault handling method 400 for a single disconnect system. Specifically, where an entry in the table 500 indicates that the secondary disconnect should be opened or closed, the corresponding action that is taken in the single disconnect circuit breaker 200 is actuation of the primary disconnect 203 with the primary disconnect open/close system 219 (as opposed to actuating the primary disconnect 203 with the primary disconnect trip system 217). It is noted that the table 500 provides more operating conditions than are provided in the flow chart for the fault handling method 400 in FIG. 5. For ease of illustration, the term "'Til" is used in the table 500 as an abbreviation of the term "Until", and the term "microcontroller" is abbreviated as "μcontroller" using the Greek letter mu (μ) in some instances.

Column 501 provides the sequence number of each unique operating condition, and column 502 provides the category for each operating condition. It is noted that the sequence numbers used in Column 501 are simply intended to distinguish each row in the table 500 from the others, and are not intended to convey a sequential order. Column 503 describes the specific condition corresponding to each sequence number. Column block 504 includes columns 504A-504E that describe various events and component statuses that are relevant during an opening sequence of the primary and/or secondary disconnects 103, 104, 303, 304. For a given operating condition, if there is an applicable opening sequence, some or all of columns 504A-504E provide information about said opening sequence. In addition, column block 505 includes columns 505A-505E that describe various events and component statuses that are relevant during a closing sequence of the primary and/or secondary disconnects 103, 104, 303, 304. For a given operating condition, if there is an applicable closing sequence, some or all of columns 505A-505E provide information about said closing sequence. It will be appreciated that the sequences of operation detailed in the table 500 can be adapted and optimized as necessary for both multiple disconnect systems and single disconnect systems to take into consideration country specific safety and reliability codes and/or other applicable requirements.

Figure 8:
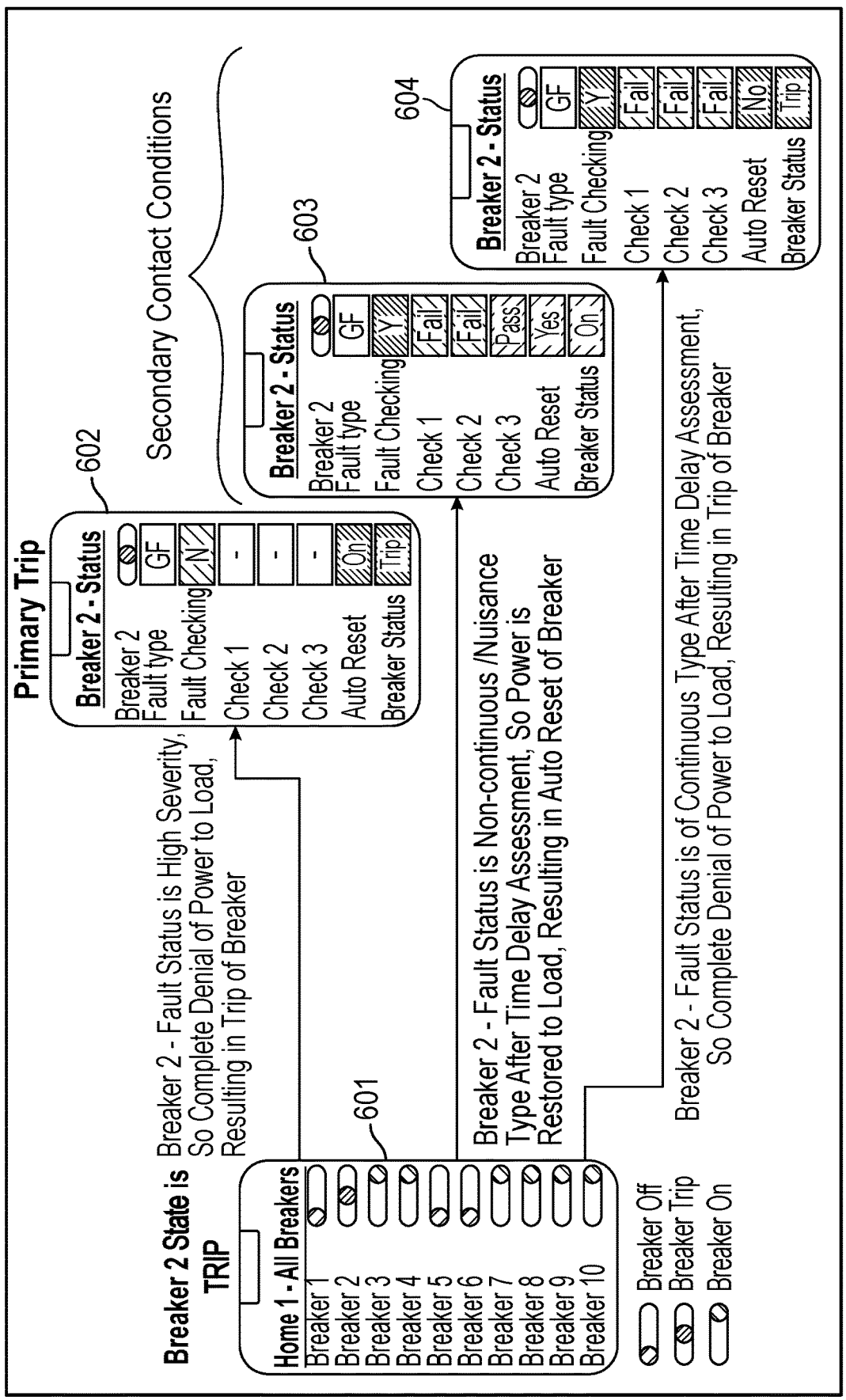
FIG. 8 is a block diagram showing illustrative examples of the screens that are generated in a user's mobile phone app during three different fault scenarios that can occur in the circuit breakers shown in FIGS. 1-3, in accordance with an exemplary embodiment of the disclosed concept.

FIG. 8 shows non-limiting illustrative examples of the screens that would appear on the mobile phone app of a user of one of the circuit breakers 100, 200, 300, in accordance with the fault handling method 400, if the controller 116, 216, 316 is configured to automatically reset the secondary disconnect driving circuitry 11, 318 or primary disconnect open/close system 219 after a minor fault (i.e. in accordance with step 433 of the fault handling method 400). At screen 601, Breaker 2 is shown to be in a TRIP state. It is noted that, with regard to the screen 601 shown in FIG. 8, the term "TRIP" is used to denote to the user that at least one disconnect has been opened, but not necessarily that a disconnect requiring manual intervention to re-close has been opened. Screen 602 will appear after screen 601 if the detected fault condition is a high severity condition, for example and without limitation, as detected at step 408, 411, or 415 of the fault handling method 400. Screen 603 will appear after screen 601 if the detected fault condition is a minor fault condition such as a non-continuous low severity fault or a nuisance type fault that ceases after the time delay. For example and without limitation, screen 603 will appear if the fault is one of the types detected at step 403, 405, 406, 409, 412, 413, or 416 of the fault handling method 400, and the opened disconnect can be automatically reset after steps 430-433 are performed. Screen 604 will appear after screen 601 if the detected fault condition is a minor condition that persists after the time delay. For example and without limitation, screen 603 will appear if the fault is one of the types detected at step 403, 405, 406, 409, 412, 413, or 416 of the fault handling method 400, and the fault continues to persist at step 432 such that steps 450-452 have to be performed.

Figure 9:
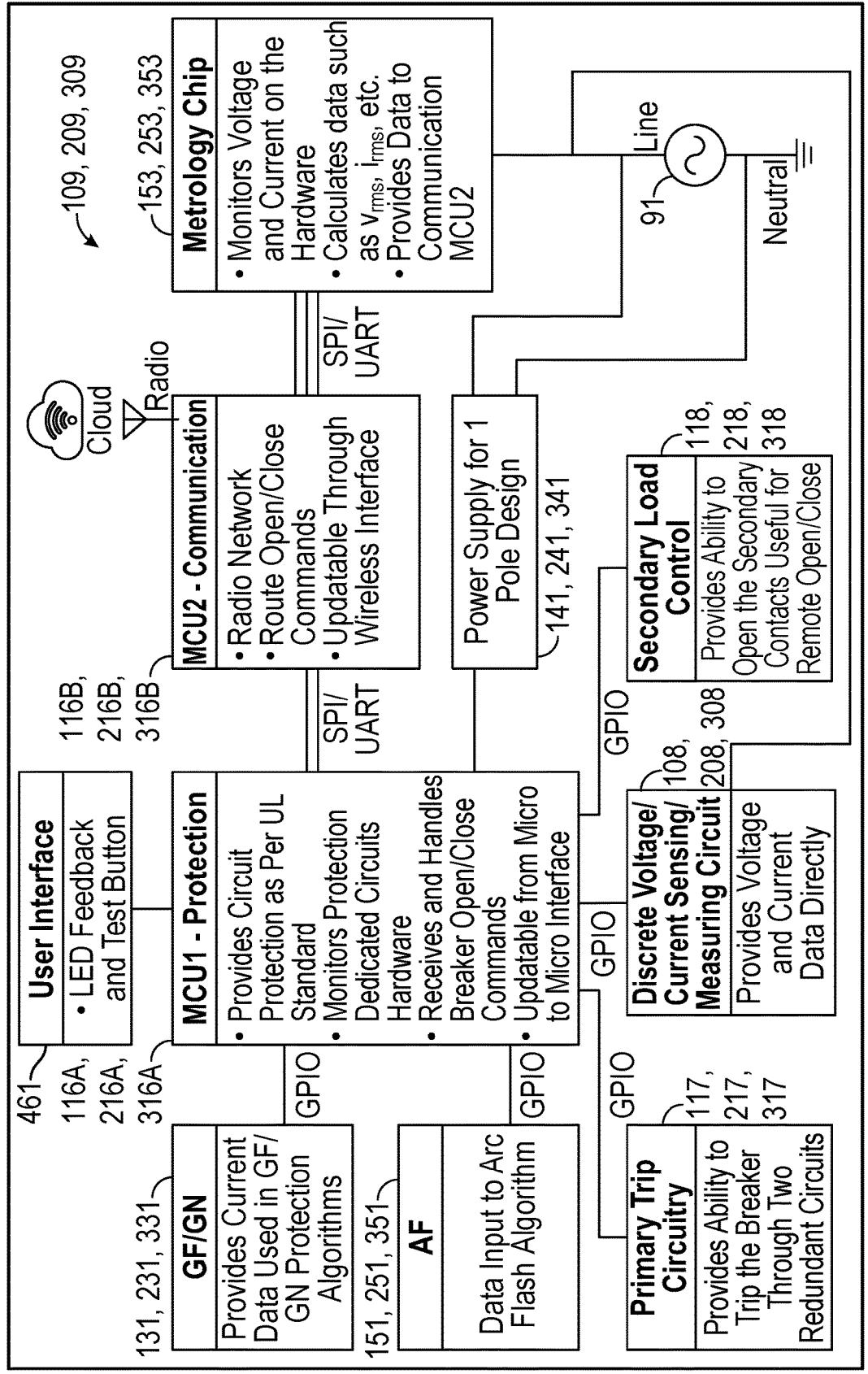
FIG. 9 is a block diagram of exemplary architecture for the smart monitoring systems shown in FIGS. 1-3, in accordance with an exemplary embodiment of the disclosed concept.

FIG. 9 provides a non-limiting illustrative example of the architecture that a smart circuit breaker 100, 200, 300 having a smart monitoring system 109, 209, 309 can have, in accordance with an exemplary embodiment of the disclosed concept. Because the circuit breakers shown in FIGS. 1-3 are 1-pole circuit breakers, FIG. 9 depicts architecture for a 1-pole circuit breaker. However, similarly to FIGS. 1-3, the architecture shown in FIG. 9 can be used with multi-pole circuit breaker embodiments as well, as detailed later herein. In FIG. 9, the commonly known abbreviations GPIO, UART, and SPI are used respectively to denote general purpose input/output, universal asynchronous receiver-transmitter, and serial peripheral interface. In addition, the abbreviations GF, GN, AF, and MCU are used to denote ground fault, ground neutral, arc, and microcontroller unit. While the power supply 341 and ground fault detection circuit 331 were previously only depicted in FIG. 3, it will be appreciated that a corresponding power supply 131, 231 and ground fault detection circuit 131, 231 can also be implemented in the circuit breakers 100, 200 of FIGS. 1 and 2, and are thus included in FIG. 9. In addition, an arc detection module 151, 251, 351 is provided as another illustrative example of a device suitable for monitoring operating conditions within a circuit breaker that provides input used for fault handling determinations to the controller 116, 216, 316.

While FIGS. 1-3 depict the smart monitoring systems 109, 209, 309 as including one controller 116, 216, 316, it will be appreciated that the smart monitoring systems 109, 209, 309 can include multiple controllers (i.e. controllers 116A/116B, 216A/216B, 316A/316B) as depicted in FIG. 9, without departing from the scope of the disclosed concept. In the two-controller embodiment, the two controllers are in communication with one another, with a first controller 116A, 216A, 316A being configured to execute fault handling in accordance with the method 400, and a second controller 116B, 216B, 316B being configured to communicate with the user (e.g. using a radio antenna) through a mobile phone app, HMI, cloud (as depicted in FIG. 9), or other channel. A user interface 461 in communication with the fault handling controller 116A, 216A, 316A is also provided to enable a user to actuate a test of the fault handling capability of the smart monitoring system 109, 209, 309 (the user interface 461 can be implemented in any of the circuit breakers 100, 200, 300). A metrology chip 153, 253, 353 can be provided in the two-controller embodiment to monitor conditions of the power supply 91 and other hardware. The metrology chip is configured to provide monitoring data to only the communication microcontroller 116B, 116B, 316B in order to avoid unnecessarily complicating the programming of the fault handling microcontroller 116A, 216A, 316A, as the metrology data is not used for fault handling. Providing the metrology data to the user alerts the user of any anomalies in the power supply 91 or other hardware, so that the user can determine if the power supply 91 or other hardware needs to be inspected.

In the two-controller embodiment of the circuit breakers 100, 200, 300, the second controller 116B, 216B, 316B can receive regular over the air (OTA) updates to its communication codes to ensure that the smart monitoring system 109, 209, 309 is able to continue to communicate with the user in the event that the user upgrades his/her communication device. The two-controller design ensures that only the communication codes for the second controller 116B, 216B, 316B can be updated, while the fault handling codes for the first controller 116A, 216A, 316A remain the same and compliant with applicable safety codes as verified prior to being made available on the market. Any updates implemented for the communication codes of the second controller 116B, 216B, 316B, are programmed to ensure that the two controllers 116A/116B, 216A/216B, 316A/316B remain able to communicate with each other as necessary without affecting the ability of the breaker 100, 200, 300 to meet applicable safety requirements.

The description of the multi-pole embodiments of the circuit breakers 100, 200, 300 provided earlier herein in connection with FIGS. 1-3 also applies to the architecture shown in FIG. 9, but it is noted that the phrase "controller and communication device" used in connection with multi-pole embodiments of the architecture shown in FIG. 9 refers to the controllers 116A/B and the user interface 461 for the circuit breaker 100, to the controllers 216A/B and the user interface 461 for the circuit breaker 200, and to the controllers 316A/B and the user interface 461 for the circuit breaker 300. More specifically, the multi-pole embodiment of the architecture shown in FIG. 9 includes a number of controllers and communication devices, and the circuit breaker 100, 200, 300 can be configured such that the number of controllers and communication devices can be common to all poles 160, 260, 360, or such that each given pole 160, 260, 360 can have a number of controllers and communication devices dedicated to the given pole. In a multi-pole embodiment of the circuit breaker 100, 200, 300 where the number of controllers and communication devices are common to all of the pole assemblies 160, 260, 360, the number of controllers and communication devices receive inputs from and transmit signals to the same components as previously described in conjunction with FIG. 9, but instead of only receiving input from and transmitting signals to one set of components in a single pole assembly 160, 260, 360, the number of controllers and communication devices receive inputs from and transmit signals to multiple sets of components (the multiple sets of components corresponding in number to the number of pole assemblies 160, 260, 360). In addition, it will be appreciated that the number of power supplies 141, 241, 341 can be adjusted as needed in the multi-pole embodiment to power the number of controllers 116A/B, 216A/B, 316A/B.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A circuit breaker, the circuit breaker comprising:
   a number of pole assemblies, each pole assembly comprising:
   a line conductor structured to be connected between a power source and a load;
   a primary disconnect device disposed along the line conductor;
   a primary disconnect trip system configured to actuate the primary disconnect device between an open state and a closed state;
   a secondary disconnect device disposed in series with the primary disconnect device along the line conductor;
   secondary disconnect driving circuitry configured to actuate the secondary disconnect device between an open state and a closed state; and
   a number of monitoring devices configured to monitor operating conditions in the pole assembly; and
   a controller,
   wherein, for each pole assembly:
   the controller is configured to receive input from the number of monitoring devices, to communicate with a remote user communication device, and to communicate with the primary disconnect trip system and with the secondary disconnect driving circuitry,
   the primary disconnect device and the secondary disconnect device must be closed in order for the load to receive power from the power source,
   the controller is configured to determine when a fault condition exists in the circuit breaker based on the input from the number of monitoring devices and to determine a severity level of the fault condition,
   when the controller determines that the fault condition severity level is minor, the controller is configured to actuate the secondary disconnect driving circuitry to open the secondary disconnect device, wait for a delay time, keep the primary disconnect device closed during the delay time, assess the fault condition multiple times during the delay time, and determine if the fault condition has resolved within the delay time, when the fault condition has resolved within the delay time, the controller is configured to actuate the secondary disconnect driving circuitry to close the secondary disconnect device without manual intervention, and when the controller determines that the fault condition severity level is high severity, the controller is configured to actuate the primary disconnect trip system to trip open the primary disconnect device without first actuating the secondary disconnect driving circuitry to open the secondary disconnect device.

2. The circuit breaker of claim 1,
wherein, for each pole assembly, the controller is configured to automatically actuate the secondary disconnect driving circuitry to close the secondary disconnect device after the fault condition has resolved.

3. The circuit breaker of claim 1,
wherein, for each pole assembly, the controller is configured to actuate the secondary disconnect driving circuitry to close the secondary disconnect device after receiving remote user instructions once the fault condition has resolved.

4. The circuit breaker of claim 3,
wherein, for each pole assembly:
the controller is configured to communicate with either a mobile phone app or a human machine interface, and
the controller is configured to receive instructions input by a user to the mobile phone app or to the human machine interface to actuate the secondary disconnect driving circuitry to close the secondary disconnect device.

5. The circuit breaker of claim 1,
wherein, for each pole assembly, when the fault condition has not resolved within the delay time, the controller is configured to actuate the primary disconnect trip system to trip open the primary disconnect device.

6. The circuit breaker of claim 5,
wherein, for each pole assembly, closing the primary disconnect device after the primary disconnect device has been tripped open requires manual intervention.

7. The circuit breaker of claim 1,
wherein, for each pole assembly, closing the primary disconnect device after the primary disconnect device has been tripped open requires manual intervention.

8. A circuit breaker, the circuit breaker comprising:
a number of pole assemblies, each pole assembly comprising:
a line conductor structured to be connected between a power source and a load;
a primary disconnect device disposed along the line conductor;
a primary disconnect trip system configured to actuate the primary disconnect device between a first open state and a first closed state;
a primary disconnect open/close system configured to actuate the primary disconnect between a second open state and a second closed state; and
a number of monitoring devices configured to monitor operating conditions in the circuit breaker; and
a controller,
wherein, for each pole assembly:
the controller is configured to receive input from the number of monitoring devices, to communicate with a remote user communication device, and to communicate with the primary disconnect trip system and with the primary disconnect open/close system,
the primary disconnect device must be closed in order for the load to receive power from the power source,
the controller is configured to determine when a fault condition exists in the circuit breaker based on the input from the number of monitoring devices and to determine a severity level of the fault condition,
when the controller determines that the fault condition severity level is minor, the controller is configured to actuate the primary disconnect open/close system to open the primary disconnect device, wait for a delay time, assess the fault condition multiple times during the delay time, and determine if the fault condition has resolved within the delay time, and
when the fault condition has resolved within the delay time, the controller is configured to actuate the primary disconnect open/close system to close the primary disconnect device without manual intervention.

9. The circuit breaker of claim 8,
wherein, for each pole assembly, the controller is configured to automatically actuate the primary disconnect open/close system to close the primary disconnect device after the fault condition has resolved.

10. The circuit breaker of claim 8,
wherein, for each pole assembly, the controller is configured to actuate the primary disconnect open/close system to close the primary disconnect device after receiving remote user instructions once the fault condition has resolved.

11. The circuit breaker of claim 10,
wherein, for each pole assembly:
the controller is configured to communicate with either a mobile phone app or a human machine interface, and
the controller is configured to receive instructions input by a user to the mobile phone app or to the human machine interface to actuate the primary disconnect open/close system to close the primary disconnect device.

12. The circuit breaker of claim 8,
wherein, for each pole assembly, when the fault condition has not resolved within the delay time, the controller is configured to instruct the primary disconnect trip system to trip the primary disconnect device to a trip state.

13. The circuit breaker of claim 12,
wherein, for each pole assembly, closing the primary disconnect device once the primary disconnect device is in the trip state requires manual intervention.

14. The circuit breaker of claim 8,
wherein, for each pole assembly, when the controller determines that the fault condition severity level is high severity, the controller is configured to instruct the primary disconnect trip system to trip the primary disconnect device to the open state.

15. The circuit breaker of claim 14,
wherein, for each pole assembly, closing the primary disconnect device after the primary disconnect device has been tripped to the open state requires manual intervention.

16. A method of handling faults in a pole assembly of a circuit breaker, the method comprising:

providing a primary disconnect device along a line conductor of the pole assembly between a power source and a load;
providing a secondary disconnect device along the line conductor in series with the primary disconnect device;
monitoring operating conditions in the pole assembly with a number of monitoring devices;
detecting a fault condition with a controller based on input to the controller from the number of monitoring devices;
determining with the controller if a severity level of the fault condition is minor or high severity;
when the fault condition is minor:
   actuating the secondary disconnect device to open with the controller;
   waiting for a delay time;
   assessing the fault condition with the controller multiple times during the delay time;
   determining with the controller whether the fault condition has resolved within the delay time;
   when the fault condition has resolved within the delay time, actuating closing of the secondary disconnect device without manual intervention; and
   keeping the primary disconnect device closed during the delay time; and
when the fault condition is high severity:
   actuating the primary disconnect device to open with the controller without first actuating the secondary disconnect device to open.

17. The method of claim 16, further comprising:
within each pole assembly, when the controller determines that the fault condition has not resolved within the delay time, actuating the primary disconnect device to open with the controller.

18. The method of claim 16, further comprising:
within each pole assembly, when the controller determines that the fault condition has not resolved within the delay time, instructing a primary disconnect trip system to trip the secondary disconnect device to a trip state.

* * * * *